(12) United States Patent
Granger (10) Patent No.: US 6,931,745 B2
(45) Date of Patent: Aug. 23, 2005

(54) CONNECTION DEVICE ASSOCIATED WITH AN ARM OF AN ARTICULATED THREE-DIMENSIONAL MEASURING APPLIANCE

(75) Inventor: Romain Granger, Lavardin (FR)

(73) Assignee: Hexagon Metrology AB, Nacka Strand (SE)

( * ) Notice: Subject to any disclaimer, the term of this patent is extended or adjusted under 35 U.S.C. 154(b) by 71 days.

(21) Appl. No.: 10/715,714

(22) Filed: Nov. 18, 2003

(65) Prior Publication Data

US 2005/0095877 A1    May 5, 2005

(30) Foreign Application Priority Data

Oct. 29, 2003  (FR)  .................................. 03 12674

(51) Int. Cl.[7] ............................................ G01B 5/004
(52) U.S. Cl. ........................................ 33/503; 33/1 PT
(58) Field of Search ............................... 33/1 PT, 503, 33/556–561

(56) References Cited

U.S. PATENT DOCUMENTS

| | | | |
|---|---|---|---|
| 4,593,470 A | 6/1986 | Davies ............................ 33/1 |
| 4,676,002 A * | 6/1987 | Slocum ....................... 33/1 PT |
| 4,888,877 A | 12/1989 | Enderle et al. ............... 33/559 |
| 5,131,166 A * | 7/1992 | Weber .......................... 33/503 |
| 5,402,582 A | 4/1995 | Raab ............................. 33/503 |
| 5,611,147 A | 3/1997 | Raab ............................. 33/503 |
| 5,794,356 A | 8/1998 | Raab ............................. 33/503 |
| 5,829,148 A | 11/1998 | Eaton ........................... 33/503 |
| 5,926,782 A | 7/1999 | Raab ........................... 702/152 |
| 6,125,337 A * | 9/2000 | Rosenberg et al. ......... 702/153 |
| 6,134,506 A | 10/2000 | Rosenberg et al. ........... 702/95 |
| 6,606,539 B2 * | 8/2003 | Raab ............................. 33/503 |
| 6,668,466 B1 * | 12/2003 | Bieg et al. .................... 33/503 |
| 2002/0029485 A1 * | 3/2002 | Pettersson .................... 33/503 |
| 2003/0191603 A1 | 10/2003 | Raab et al. ................. 702/150 |

FOREIGN PATENT DOCUMENTS

DE   41 40 294 A1   1/1993

OTHER PUBLICATIONS

Copy of French Search Report for Serial No. FA 641962 dated Jul. 9, 2004.

* cited by examiner

Primary Examiner—G. Bradley Bennett
(74) Attorney, Agent, or Firm—McCormick, Paulding & Huber LLP (57) ABSTRACT

The invention relates to a connection device associated with an arm of an articulated three-dimensional measuring appliance, the device comprising a moving assembly and a fixed assembly, together with connection means for providing an electrical link between said two assemblies. In accordance with the invention, the moving assembly comprises first and second adjacent components on a common axis, the first component being constrained to rotate with the jointed end of the arm and being connected to the second component by a coupling system having successive dogs so that said second component is entrained in rotation only after said first component has turned through significantly more than one revolution in the same direction, and the connection means comprise facing contact members carried respectively by the fixed assembly and by the second component, arranged to provide a continuous electrical link in normal operation and a link that is restricted to a short angular range of rotation once the second component is entrained in rotation by the first component.

11 Claims, 6 Drawing Sheets

CONNECTION DEVICE ASSOCIATED WITH AN ARM OF AN ARTICULATED THREE-DIMENSIONAL MEASURING APPLIANCE

This application is entitled to the benefit of and incorporates by reference essential subject matter disclosed in French Patent Application No. 03 012674 filed on Oct. 29, 2003.

FIELD OF THE INVENTION

The present invention relates to a connection device associated with an arm of an articulated three-dimensional measuring appliance.

BACKGROUND OF THE INVENTION

There exist very numerous patent documents illustrating structures for articulated three-dimensional measuring appliances including a plurality of joint axes. Thus, recent measuring appliances have up to six axes.

Reference can be made to documents U.S. Pat. No. 5,402,582, U.S. Pat. No. 5,611,147, U.S. Pat. No. 5,794,356, and U.S. Pat. No. 5,926,782. In general, articulated three-dimensional measuring appliances conventionally comprise a moving assembly rigidly secured to a jointed end of an arm and mounted in the tubular body of the arm to turn about the longitudinal axis of said arm, and a fixed assembly mounted to the other end of the arm, together with connection means for providing an electrical link between the two assemblies.

More recently, it has been found advantageous to improve the conventional structures of articulated measuring appliances so that the operator can cause at least one of the arms to turn through several revolutions about its central axis. However, articulated three-dimensional measuring appliances are conventionally fitted in each arm with an angle coder enabling rotation about the corresponding axis to be measured. Consequently, the desire for a very large range of rotation, or even an infinite range of rotation, requires a solution to the problem of providing a connection to establish the electrical link between the fixed elements and the moving elements.

In this respect, reference can be made to documents U.S. Pat. No. 4,888,877, U.S. Pat. No. 4,593,470, and DE-A-41 40 294.

More recently, arrangements have been developed making use of rotary connectors with circular tracks, using technology that is already well known in couplings for machine members, so as to achieve a range of rotation that can be considered as being infinite. In this respect, reference can be made to document U.S. Pat. No. 5,829,148. That document teaches providing at least some of the joints with a degree of freedom that enables them to be swept over an unlimited arc, with a rotary connector subassembly having multiple contacts for transmitting electrical signals through such joints.

However, none of the solutions set out in the above-mentioned patents gives full satisfaction.

If the range of rotation possible at a joint between two adjacent arms in a three-dimensional measuring appliance is to be limited, it is possible to provide an abutment system associated with a desired maximum range of rotation, e.g. at least 700° to 720°. If the abutment is a rigid mechanical abutment, making contact inevitably leads to a jolt which is transmitted along the articulated structure, which inevitably leads to the appliance losing calibration. Under such circumstances, it is necessary to recalibrate the appliance prior to taking new measurements. In order to avoid such jolting, it is possible to provide an abutment that is more flexible, e.g. in the form of a fusible abutment. However, under such circumstances, on coming into abutment, if the operator applies a certain amount of torque to the corresponding arm, then the abutment ruptures, thereby avoiding generating excessive jolting. However, in spite of the improved security that is thus obtained, it is not possible to prevent the electrical connection wires becoming twisted and knotted or breaking. This means that the various abutment systems that might be envisaged are considered as being not being very satisfactory.

To avoid the above-mentioned drawbacks inherent to rigid or flexible abutments, the only proposals that have been made relate to rotary connectors with circular tracks and wipers. In particular, above-mentioned document U.S. Pat. No. 5,829,148 discloses a rotary connector system having a cylindrical drum carrying circular tracks which are contacted by associated fixed wipers. However, that type of arrangement is not completely satisfactory concerning the quality of the electrical contact between the wipers and the tracks. Consequently, it is not possible to avoid generating interference which disturbs the measurement signal. Furthermore, the need to exert rotary torque of non-negligible level on the arm concerned also runs the risk of interfering with measurement accuracy: even a small amount of torque applied to a jointed arm of a multiple-arm measuring appliance can lead to an error of a few microns in the terminal sensor, thereby falsifying measurement to a greater or lesser extent.

SUMMARY OF THE INVENTION

The present invention seeks to devise a connection device associated with an arm of an articulated three-dimensional measuring appliance, while avoiding the above-mentioned drawbacks, making it possible to have a large range of rotation that is satisfactory for the joints concerned of the jointed arms, without losing electrical power supply, and without running the risk of losing calibration which would spoil measurement accuracy.

According to the invention, the above-mentioned problem is solved by a connection device associated with an arm of an articulated three-dimensional measuring appliance, the device comprising a moving assembly rigidly secured to a jointed end of the arm and mounted in the tubular body of the arm to turn about the longitudinal axis of said arm, and a fixed assembly mounted at the other end of the arm, together with connection means for providing an electrical link between these two assemblies, the device being remarkable in that the moving assembly comprises first and second adjacent components on a common axis, each presenting a central passage for passing electrical connection wires, the first component being constrained to rotate with the jointed end of the arm and being connected to the second component by a coupling system having successive dogs so that said second component is not entrained in rotation until said first component has been entrained in rotation through significantly more than one complete revolution, and in that the connection means include facing contact members carried respectively by the fixed assembly and by the second component of the moving assembly, said contact members being arranged to provide a continuous electrical link in normal operation without the second component being entrained in rotation, and an electrical link that is limited to a short angular range of rotation when said second component is entrained in rotation by the first component.

Thus, the coupling system with successive dogs allows large ranges of rotation to be used, in particular ranges that may reach two or three or four revolutions, and this is made possible without interfering with measurement by undesirable friction, while nevertheless conserving electrical contact, given that the second component of the moving assembly does not move. Only at the end of the rotary stroke is the second component of the moving assembly caused to turn, and after a short predetermined range of rotation, contact is interrupted, thereby immediately warning the operator who can then return in reverse. It then suffices to go back past an angular index in order to restart the appliance in the event of the allowed angular range being exceeded. It is also ensured that measurement accuracy is not lost since interrupting contact by going beyond the intended range ensures that the torque exerted on the arm has no effect on measurement since specifically the appliance is no longer in a state to take any kind of measurement due to the electrical power supply being interrupted.

Preferably, the coupling system having successive dogs provided between the two components of the moving assembly is arranged to engage after the first component has turned through about three complete revolutions relative to the second component. In particular, it is advantageous to provide for the device further to comprise a complementary indexing system arranged between the moving assembly and the tubular body of the arm, said indexing system being arranged to provide a hard point that is perceptible by the operator of the measuring appliance when the same range of about three revolutions is exceeded. It is extremely advantageous for the operator to have such a hard point since it then suffices for the operator to make one complete turn in one direction or the other in order to find an identifiable position. After performing one or two turns in reverse, the operator can again go past the coder and no reinitialization is needed.

Advantageously, the first component of the moving assembly is a hollow shaft acting as a coder shaft for an angle coder arranged in the arm to measure the rotation of the jointed end about the longitudinal axis of said arm. Such an arrangement makes it possible to have a structure that is particularly compact.

Also advantageously, the second component of the moving assembly comprises two disks on a common axis interconnected by a hollow shaft, a first one of the disks forming part of the coupling system having successive dogs and a second one of the disks having an inner face carrying contact members which co-operate with the contact members carried by the fixed assembly.

In which case, preferably, the contact members carried by the second disk of the second component of the moving assembly comprise coaxial tracks in the form of circular arcs defining the short angular range of rotation, and the contact members carried by the fixed assembly comprise at least one wiper block whose wipers co-operate with respective tracks of the other contact members. In particular, the contact members carried by the fixed assembly comprise two wiper blocks that are circumferentially spaced apart by an angle corresponding substantially to the short angular range of rotation so that the wipers of the two blocks come into contact with the respective tracks only when the second component of the moving assembly is in a central position which corresponds to the normal operation position.

Provision can then be made for the short angular range of rotation to be about 20° to 30°.

Furthermore, the co-operation between the wipers of the wiper block(s) and the coaxial tracks can be obtained either merely by relative rotation, or in a variant by relative axial translation and relative rotation.

Finally, and preferably, the electrical connection wires passing inside the two components of the moving assembly are connected to the coaxial tracks carried by the second disk of the second component of the moving assembly, the wiper block(s) carried by the fixed assembly serving to provide a link with electrical connection wires associated with a coder card assembly secured to the fixed assembly.

Other characteristics and advantages of the invention appear more clearly in the light of the following description and the accompanying drawings relating to a particular embodiment.

BRIEF DESCRIPTION OF THE DRAWINGS

Reference is made to the figures of the accompanying drawings, in which.

DETAILED DESCRIPTION OF THE INVENTION

Reference is made below to FIGS. 1 to 11 to describe in greater detail the structure of an arm of an articulated three-dimensional measuring appliance fitted with a connection device in accordance with the invention.

Figure 1:
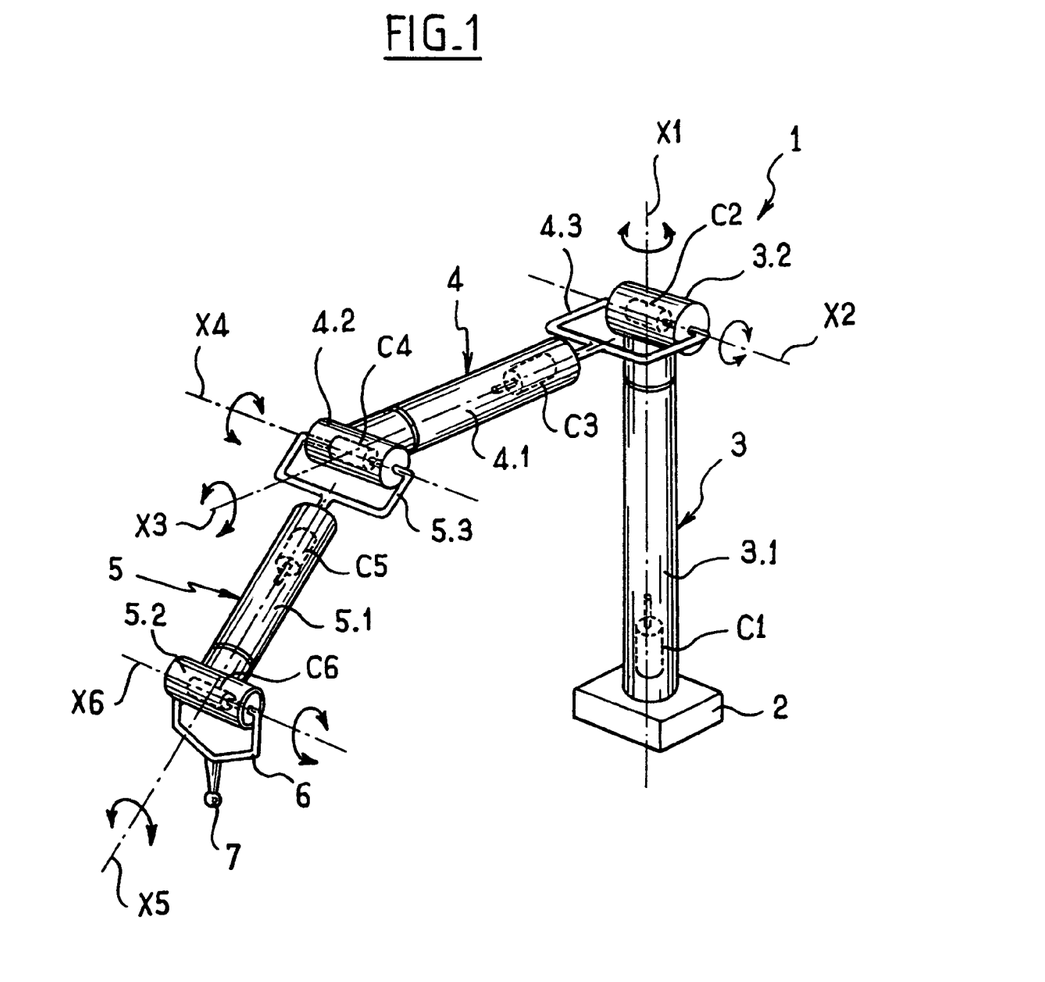
FIG. 1 is a perspective view of an articulated three-dimensional measuring appliance with at least some of the joints being fitted with respective connection devices in accordance with the invention.

FIG. 1 shows an articulated three-dimensional measuring appliance referenced 1 comprising specifically a support stand 2 on which a rotary first arm 3 is mounted, followed by two jointed arms 4 and 5 and a measurement sensor 7 mounted at the end of a fork-shaped jointed support 6. Such a structure for the appliance is entirely conventional in general terms.

The first arm 3 comprises a tubular body 3.1 of axis X1 terminated by a jointed end 3.2 capable of turning about the central axis X1. The jointed end 3.2 carries a pivoting fork 4.3 forming part of the following arm 4, which fork can pivot about an axis referenced X2. The following arm 4 is connected to the pivoting fork 4.3 and comprises a tubular body 4.1 and a jointed end 4.2, which end is capable of turning about the central axis of the arm 4, referenced X3. The jointed end 4.2 is in turn fitted with a pivoting fork 5.3 forming part of the following arm 5. The fork 4.3 can pivot about the axis X4 of the jointed end 4.2 of the arm 4. The arm 5 associated with the fork 5.3 in turn comprises a tubular body 5.1 and a jointed end 5.2, which end can turn about the central axis 5.3 of said arm. Finally, the jointed end 5.2 is fitted with a terminal fork 6 terminated by a measurement sensor 7. The terminal fork 6 and the associated measurement sensor 7 can pivot about the axis X6 of the jointed end 5.2 of the arm 5.

It can thus be seen that there are six joint axes referenced X1, X2, X3, X4, X5, and X6. The arm is thus a so-called "six-axis" measuring arm. The angles of rotation about each of these axes are measured individually by associated angle coders that are integrated in the corresponding portions of the moving arms, these coders being referenced herein C1, C2, C3, C4, C5, and C6 which are associated with the corresponding axes X1, X2, X3, X4, X5, and X6.

Pivoting of the forks 4.3, 5.3, and 6 about the respective axes X2, X4, and X6 is de facto limited by construction to an angle of less than 360°, by coming into abutment against one face or the other of the body of the associated arm. Consequently, the problem of wires associated with the bus that is generally fitted to this type of appliance does not raise particular difficulties because of the structural limit on the available range of rotation, so these wires do not run any risk of twisting or breaking.

In contrast, for the axis X1 and above all for the axes X3, and X5, it is advantageous for the operator to have a large range of rotation even if it is not without limit. In practice, it is desirable to have at least 700° to 720° (a little more than two revolutions), or better 1050° to 1080° (a little less than three revolutions) for each range of available rotation, while maintaining electrical contact continuously via connection means that are provided, but it is essential to ensure that this rotation does not lead to the arm in question losing calibration.

The members fitted to one of the arms for which a large range of rotation is desired while maintaining electrical contact are described below, the arm preferably being the arm 4 or 5 of the appliance described above with reference to FIG. 1.

In FIGS. 2 to 11, to which reference is made below, the arm in question is referenced 10 and its jointed end 12, it being understood that the structure described can apply to any one of the jointed arms of the measuring appliance for which a large range of rotation is desired while maintaining electrical contact, said range nevertheless being angularly limited.

Figures 2, 3:
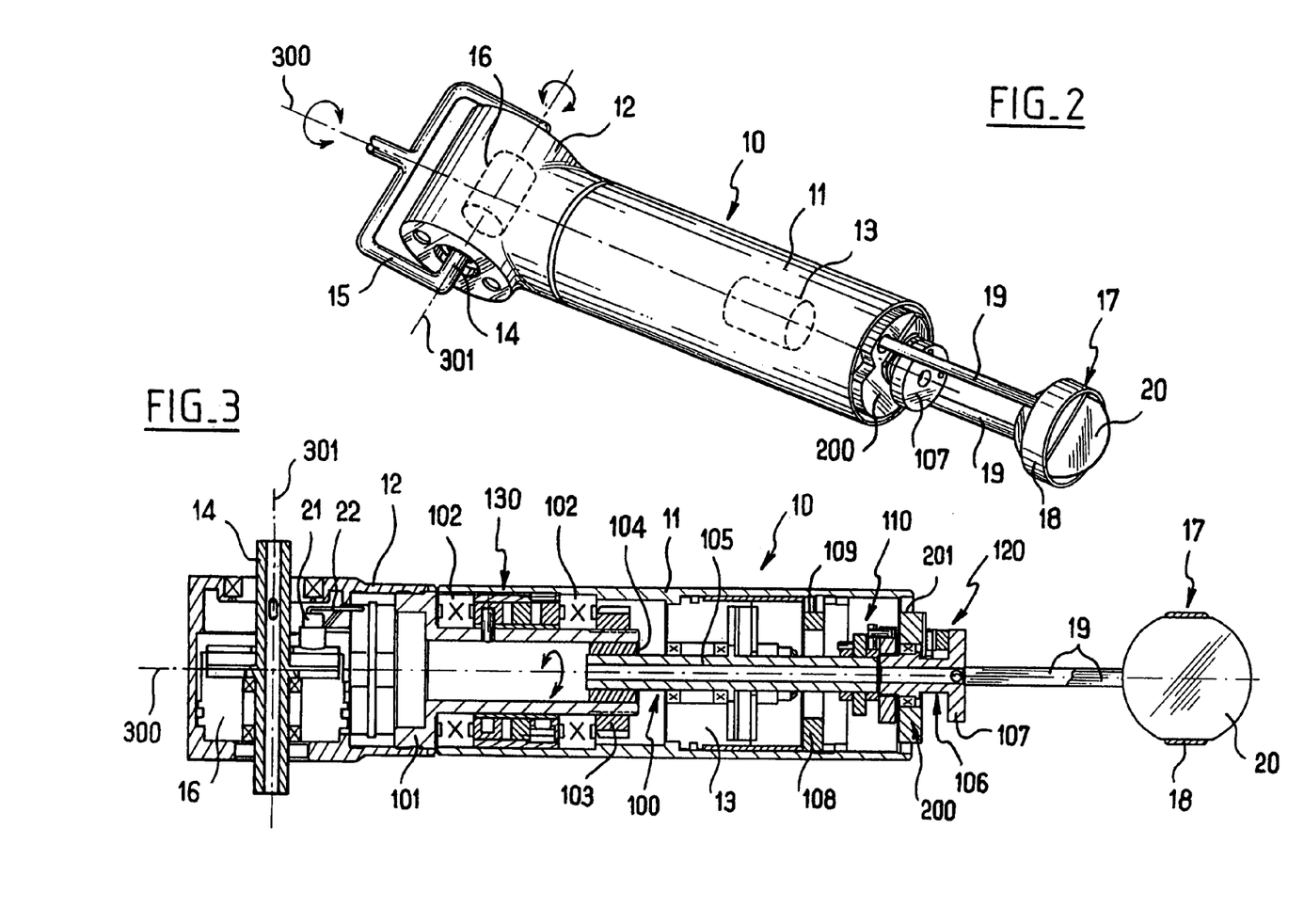
FIGS. 2 and 3 are respectively a perspective view and an axial section of one of the arms of the above-mentioned measuring appliance, showing the general arrangement of the various components of the moving assembly and of the fixed assembly, and also the arrangement of the specific connection means for providing the electrical connection between said two assemblies.

FIG. 2 thus shows an arm 10 whose longitudinal axis is referenced 300. The arm 10 comprises a tubular body 11 and a jointed end 12 mounted in the tubular body 11 of the arm to turn about the longitudinal axis 300 of said arm. The jointed end 12 is fitted with a pivoting fork 15 (visible only in FIG. 2) connected to a shaft 14 corresponding to the pivot axis referenced 301 and which extends perpendicularly to the longitudinal axis 300. Rotation of the arm 10 about the transverse pivot axis 301 is measured by an associated angle coder 16 housed in the jointed end 12, while rotation of the jointed end 12 about the central axis 300 is measured by an angle coder 13 housed in the tubular body 11. In FIG. 2, there can also be seen a disk 107 forming the terminal portion of a moving assembly of the connection device of the invention, together with a terminal plate 200 belonging to a fixed assembly of said connection device. Two columns 19 extend longitudinally on either side of the disk 107, being secured to the plate 200, and supporting at their ends an assembly 17 associated with a coder card 20. Specifically, the coder card 20 is constituted by a plate which is supported by an annular support 18.

FIG. 3 shows more clearly the various members concerned.

In the jointed end 12 of the arm 10, there can be seen the shaft 14 associated with the hinge axis 301 which constitutes the axis of the coder 16 whose associated card is not shown in this figure. The wires of the coder are subjected at most to displacements corresponding to rotation through half a turn, so the problem of these connection wires becoming twisted does not arise. There can also be seen a bus element 21 from which the wires 22 extend.

The jointed end 12 is rigidly secured to a moving assembly which is mounted in the tubular body 11 of the arm to turn about the longitudinal axis 300 of said arm. The moving assembly 100 thus comprises a tubular part 101 which is rigidly secured to the jointed end 12 of the arm 10, and which is mounted to turn about the central axis 300 via two interposed bearings 102 bearing against the tubular body 11. The assembly is clamped by means of a nut 103 which is tightened onto the threaded end of the rotary part 101. The rotary part 101 serves to drive a moving assembly referenced 100 in rotation about the central axis 300 via a coupling ring 104, in this case constituted by an elastic ring.

In accordance with a first characteristic of the invention, the moving assembly 100 has first and second adjacent components 105 and 106 on a common axis each having a central passage 105.1, 106.1 for passing electrical connection wires, the first component 105 being constrained to rotate with the jointed end 12 of the arm and being connected to the second component 106 by a coupling system 110 having successive dogs so that said second component is driven in rotation only after said first component has turned in the same direction through considerably more than one revolution.

Figure 4:
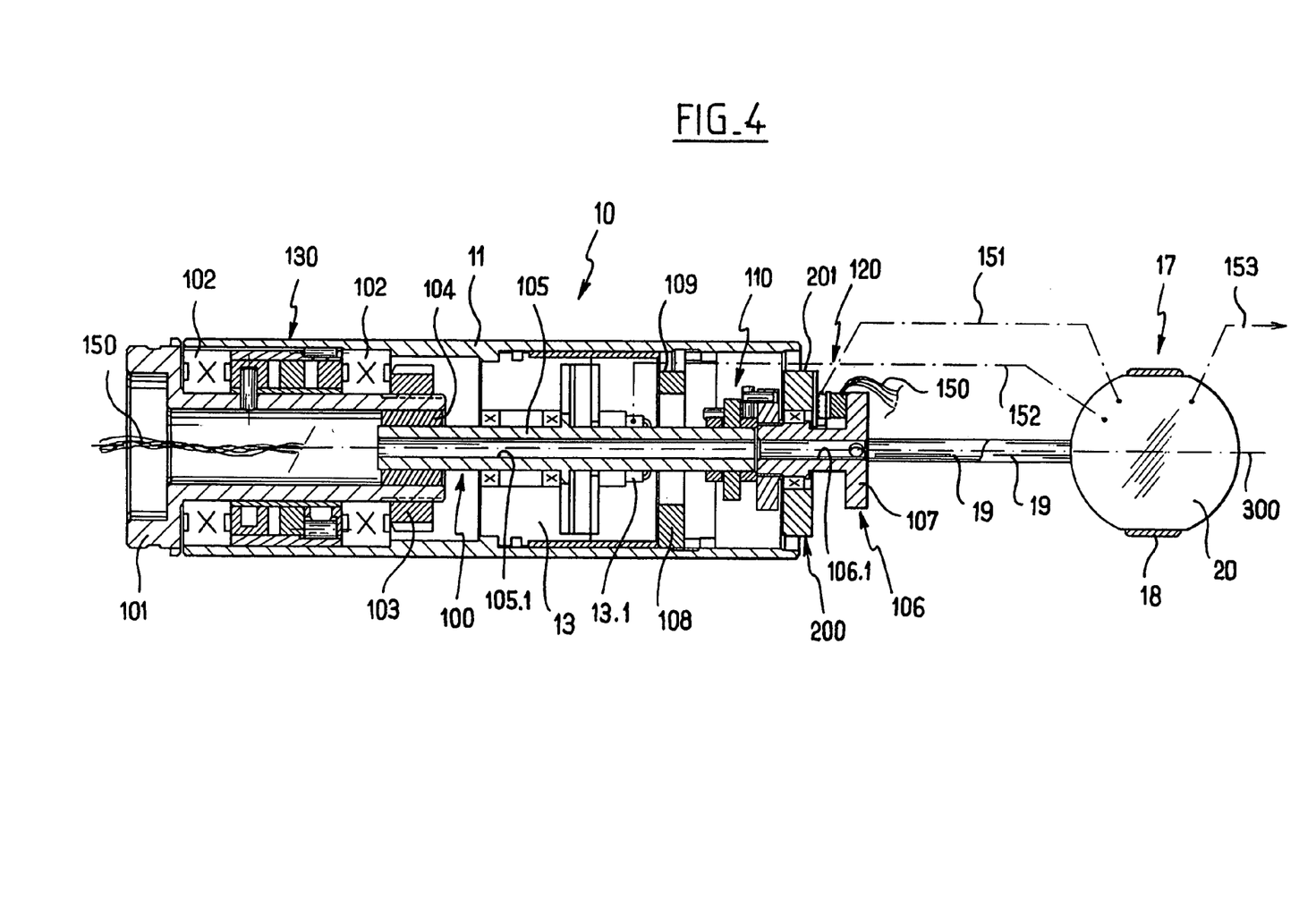
FIG. 4 is an axial section view on a larger scale showing the portion of the above arm which extends beyond the end of the joint of said arm.
Figure 5:
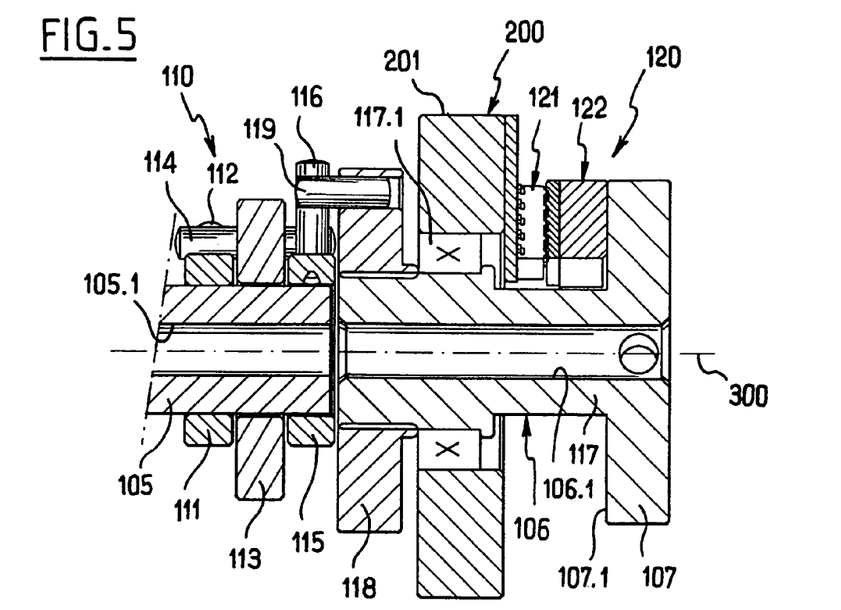
FIGS. 5 and 6 are respectively an axial section view and a perspective view of the portion of the connection device of the invention relating to the coupling system having successive dogs and the arrangement of the corresponding contact members (in the contacting position)
Figure 6:
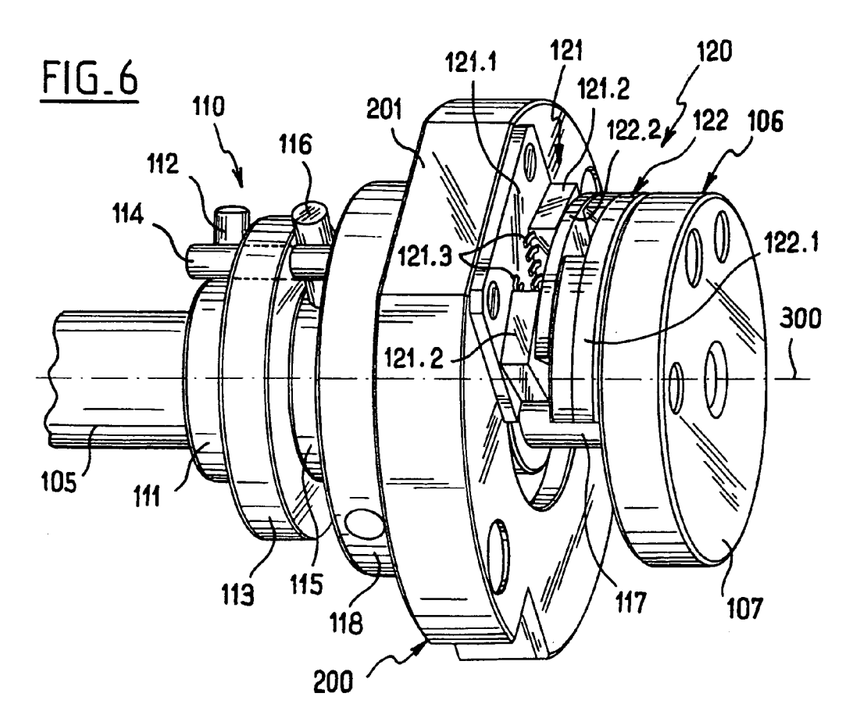

These various members are more clearly visible in FIGS. 4 to 6.

The first component 105 of the moving assembly 100 is a hollow shaft acting as a coder shaft for the angle coder 13 which is arranged in the arm 10 to measure rotation of the rotary end 12 about the longitudinal axis 300 of said arm. In FIG. 4, the coder 13 can be seen together with its multiple-wire connector 13.1 (generally provided for eleven wires). Electrical connection wires represented by a chain-dotted line 152 in FIG. 4 connect the connector 13.1 to the coder card 20. In this respect, it should be observed that the ring 108 (for holding the coder 13 in position in the tubular body 11) presents a local flat 109, and the fixed terminal plate 200 also presents a corresponding flat 201, these two flats 109 and 201 co-operating with the facing inside surface of the tubular body 11 to define a passage for the wires 152. In contrast, the wires referenced 150 and visible only in FIG. 4, generally five wires, for passing along the central passage of the moving assembly 100, i.e. the passages 105.1 and 106.1 of the two components 105 and 106 of said assembly, extend from the end of the arm so as to be connected to contact members forming part of connector means 120 which are described in detail below. Other link wires, represented by line 151 connect other contact members (corresponding to the preceding members) to the coder card 20. The link wires extending from the coder card 20 are merely represented by a line 153.

Reference is made below more particularly to FIGS. 5 and 6 while describing the coupling system 110 having successive dogs, which system is interposed between the two adjacent coaxial components 105 and 106 of the moving assembly 100.

Specifically, a coupling system 110 is provided that is arranged to engage after the first component 105 has turned through about three revolutions in the same direction relative to the second component 106. For this purpose, the hollow shaft 105 constituting the first component is fitted with a first disk 111 which is constrained to rotate therewith. The disk 111 presents a radial finger 112 capable of co-operating with an axial finger 114 secured to a second disk 113 mounted to rotate freely and without friction on the hollow shaft 105. Thus, after turning through slightly less than one complete revolution (given the angle occupied by the axial finger 114), continuing rotation of the hollow arm 105 entrains the disk 113 in rotation. A third disk 115 is also provided, likewise turning freely and without friction on the hollow shaft 105. The disk 115 is fitted with a radial finger 116 with which the other portion of the above-mentioned axial finger 114 can co-operate. Consequently, after turning through slightly less than two complete revolutions, the disk 115 is in turn entrained in rotation. Finally, the second component 106 has a disk 118 which is fitted with an axial finger 119 with which the radial finger 116 of the disk 115 can co-operate. Finally, when rotation has been performed in the same direction by the first component 105 through about three revolutions, only then is the second component 106 of the moving assembly in turn entrained to rotate about the axis 300.

In addition, the connection means referenced 120 for providing an electrical link between the moving assembly 100 and the fixed assembly 200 comprise facing contact members 121, 122 carried respectively by the fixed assembly 200 and by the second component 106 of the moving assembly 100. In accordance with a second characteristic of the invention, these contact members are arranged to provide a continuous electrical link in normal operation without the second component of the moving assembly being entrained in rotation, and an electrical link that is limited to a short angular range of rotation when said second component is entrained in rotation by the first component.

Thus, the contact members 121 and 122 of structure described in greater detail below are normally in a middle position, and they do not depart therefrom so long as the second component 106 is not entrained in rotation. In other words, in normal operation, the operator is entirely free to turn the arm in question so that it rotates through one, two, or slightly less than three revolutions, depending on circumstances, without there being any perceptible jolt for the machine, given the practically friction-free entrainment achieved by the coupling system 110 having successive dogs, thereby ensuring that the measurements performed are not disturbed in any way. It should be observed that putting the fingers 112 & 114, then 114 & 116, and finally 116 & 119 into co-operation does not give rise to any perceptible jolt. If it turns out that the operator reaches the end of the range of rotation, designed in this example to be slightly less than three revolutions, only then is the second component 106 entrained in rotation by the first component 105, and electrical contact will be interrupted very quickly, thereby avoiding the presence of any falsified measurements.

The structure of the contact members 121 and 122 is described below in greater detail with reference to FIGS. 6 to 9, said members forming the connection means 120 of the connection device of the invention.

Figure 7:
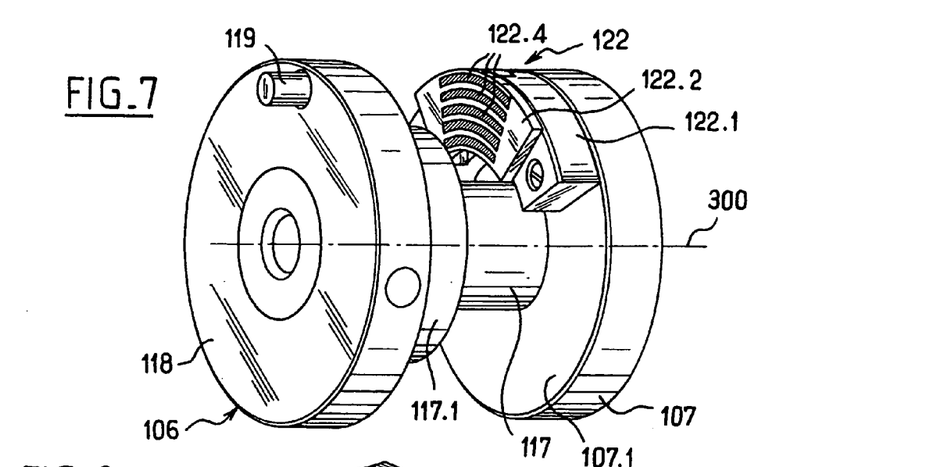
FIG. 7 is a perspective view of the component of the moving assembly that carries the coaxial tracks in the form of circular arcs forming part of the contact members associated with the moving assembly.

The contact members 122 carried by the second disk 107 of the second component 106 of the moving assembly 100 comprise a plurality of coaxial tracks 122.4 in the form of concentric circular arcs. For this purpose, a support member in the form of an arc of a cylindrical ring 122.1 is screwed to the inside face 107.1 of the disk 107 of the second component 106. A plate 122.2 is mounted on this support 122.1 and the free face of the plate carries the tracks 122.4 in the form of circular arcs. The number of tracks is naturally a function of the number of contacts that are desired, and in this case a set of five tracks is shown insofar as a five-wire situation is frequently encountered.

Figures 8, 9:
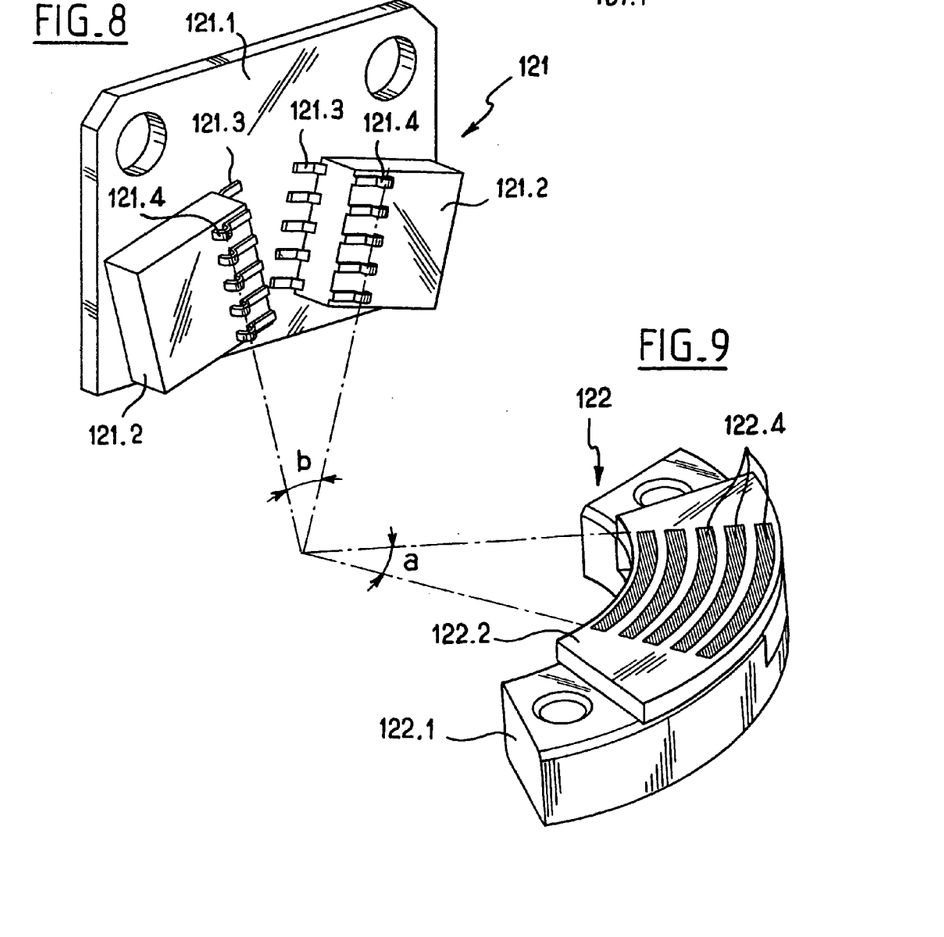
FIGS. 8 and 9 are fragmentary perspective views showing the contact members associated respectively with the fixed assembly and with the moving assembly.

FIG. 9 shows a set of coaxial tracks 122.4 on their common support. The corresponding angle is referenced a, defining a small angular range of rotation in one direction or the other that corresponds to interrupting electrical power supply.

The contact members 121 carried by the fixed assembly 200 comprise at least one block of wipers 121.2, in which the wipers 121.4 co-operate with the respective tracks 122.4 of the other contact members 122. Specifically, the contact members 121 comprise two blocks of wipers 121.2 circumferentially spaced apart by an angle b, this angle b corresponding substantially to the above-mentioned small angular range of rotation. Thus, the wipers 121.4 of the two blocks 121.2 come into contact with respective tracks 122.4 only when the second component 106 of the moving assembly 100 is in a central position, which position corresponds to its normal operating position, or else over a very small angular range on either side of said central position. By way of indication, this short angular range of rotation may be of the order of 20° to 30°. The two blocks of wipers 121.1 also include connection tabs 121.3 having connection wires soldered thereto and represented in FIG. 4 by chain-dotted line 151, thus connecting the first contact members 122.2 to the coder card 20.

The relative angular disposition of the wiper blocks and the conductive tracks in the form of circular arcs makes it possible, if so desired, to interrupt electrical power supply as soon as the system departs from the middle operating position.

Specifically, co-operation between the wipers 121.4 of the wiper blocks 121.2 and the coaxial tracks 122.4 is obtained merely by rotation. Naturally, in a variant which is not shown herein, provision could be made for this co-operation to be obtained both by relative axial translation and by relative rotation, for example by arranging a system of cams that moves the moving contact members away from or towards the fixed contact members.

In practice, an audible alarm is provided in association with the measuring appliance to emit a signal when the maximum range of rotation for the jointed end of the arm in question is reached, in this case slightly less than three complete revolutions. If this limit is exceeded, electrical contact is interrupted but the operator can make one more revolution until contact is reestablished. At that moment, a warning lamp, e.g. a light-emitting diode (LED) serves to inform the operator of this situation. It then suffices for the operator to apply rotation in the opposite direction through one or two revolutions in order to go back past the coder and restart the appliance automatically without it being necessary to perform any recalibration operation.

In order to assist the operator in this operation, it is advantageous to provide a complementary indexing system arranged between the moving assembly 100 and the tubular body 11, said system being arranged to provide a hard point that the operator of the measuring appliance can perceive when the same range of about three complete revolutions is exceeded.

Figure 10:
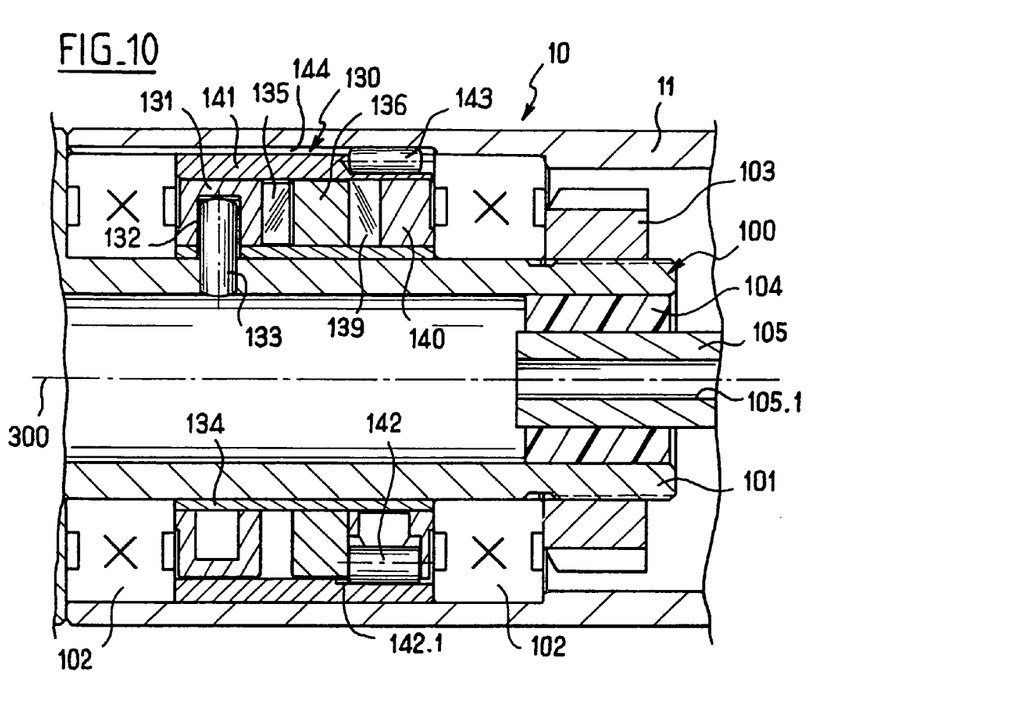
FIGS. 10 and 11 are respectively an axial section view and an isolated perspective view of a complementary indexing system arranged between the moving assembly and the tubular body of the arm to provide a hard point that can be perceived by the operator.
Figure 11:
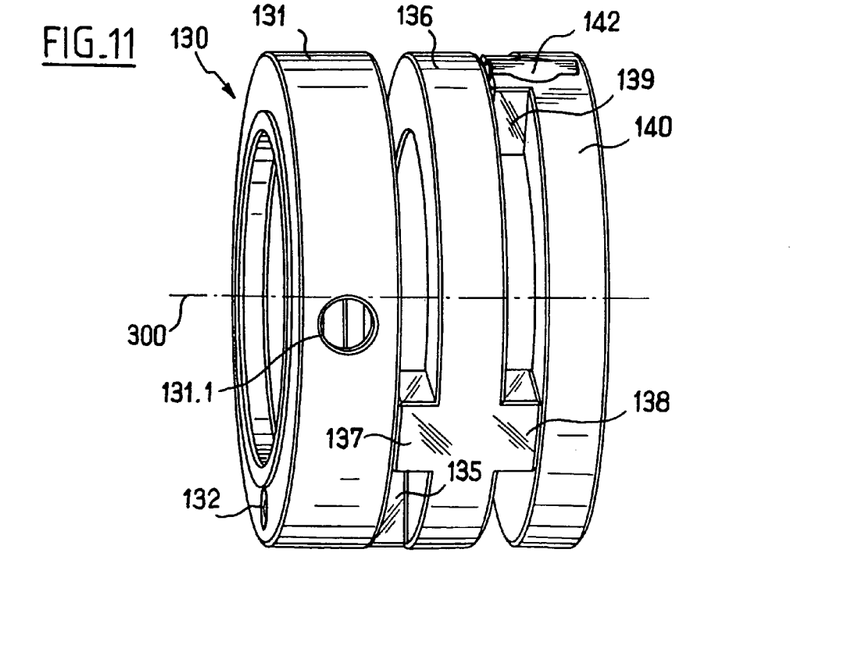

Such a complementary indexing system is provided in this case, and reference can be made to FIGS. 10 and 11 where said system is more clearly visible. There can be seen an indexing system 130 comprising a plurality of juxtaposed rings arranged to be entrained in succession in a manner similar to that provided for the coupling system 110 having successive dogs. Thus, there can be seen a first ring 131 which is fitted with an axial finger 132 for co-operating with a radial finger 133 rigidly secured to the rotary part 101. Thus, once a first revolution has been completed, the fingers 133 and 132 co-operate, and the ring 131 is entrained in rotation without friction on its bearing 134. The ring 131 carries a catch 135 for co-operating with a corresponding catch 137 projecting from the following ring 136. The catches 135 and 137 co-operate after another complete revolution. Similarly, the ring 136 carries a second catch 138 on its other face for co-operating with a catch 139 projecting from the last ring 140. In FIG. 11, there can be seen a radial hole 131.1 in the ring 131 making it easier to put the radial finger 133 into place. Thus, after the part 101 has turned through about three revolutions, corresponding exactly to the rotation of the hollow shaft 105 and the second component 106 coming into rotary coupling, all three rings 131, 136, and 140 turn together.

The hard point is obtained by a roller 142 extending from a housing 142.1 provided in an outer sleeve 141, which sleeve 141 is prevented from turning relative to the tubular body 11 by a finger 143 received in an axial groove 144 of said body 11. Thus, the operator can clearly perceive the angular displacement because of the hard point, thus making it easier to move the equipment in reverse in order to bring the assembly back past the coder. It should be observed that the bearing 134 and the sleeve 141 are of length that is determined for the purpose of adjusting the prestress of the bearings 102, and the assembly is held together by the nut 103.

A connection device is thus provided that provides very good performance insofar as it avoids the drawbacks of the prior art concerning the quality of electrical contact and the need to exert rotary torque, and this is achieved without having an abutment that would generate jolting, and without twisting the electrical connection wires. In addition, measurement accuracy is not affected in any way, even if a certain amount of torque is applied to the arm that is to be moved, which would not be the case in prior art systems having rotary connectors of the infinite rotation type.

The invention is not limited to the embodiment described above, but on the contrary covers any variant using equivalent means to reproduce the essential characteristics specified above.

In particular, a coupling system with successive dogs can be provided that limit the total range to some other angle, for example about two revolutions or about four revolutions. This can be done merely by providing an appropriate number of disks and fingers. Naturally, if a complementary indexing system is provided, then the number of rings constituting the indexing system should match the corresponding arrangement of the coupling system having successive dogs.

What is claimed is:

1. A connection device associated with an arm of an articulated three-dimensional measuring appliance, the device comprising a moving assembly rigidly secured to a jointed end of the arm and mounted in the tubular body of a arm to turn about the longitudinal axis of said arm, and a fixed assembly mounted at the other end of the arm, together with connection means for providing an electrical link between these two assemblies, wherein the moving assembly comprises first and second adjacent components on a common axis, each presenting a central passage for passing electrical connection wires, the first component being constrained to rotate with the jointed end of the arm and being connected to the second component by a coupling system having successive dogs so that said second component is not entrained in rotation until said first component has been entrained in rotation through significantly more than one complete revolution, and wherein the connection means include facing contact members carried respectively by the fixed assembly and by the second component of the moving assembly, said contact members being arranged to provide a continuous electrical link in normal operation without the second component being entrained in rotation, and an electrical link that is limited to a short angular range of rotation when said second component is entrained in rotation by the first component.

2. A device according to claim 1, wherein the coupling system having successive dogs provided between the two components of the moving assembly is arranged to engage after the first component has turned through about three complete revolutions relative to the second component.

3. A device according to claim 2, further comprising a complementary indexing system arranged between the moving assembly and the tubular body of the arm, said indexing system being arranged to provide a hard point that is perceptible by the operator of the measuring appliance when the same range of about three revolutions is exceeded.

4. A device according to claim 1, wherein the first component of the moving assembly is a hollow shaft acting as a coder shaft for an angle coder arranged in the arm to measure the rotation of the jointed end about the longitudinal axis of said arm.

5. A device according to claim 1, wherein the second component of the moving assembly comprises two disks on a common axis interconnected by a hollow shaft, a first one of the disks forming part of the coupling system having successive dogs and a second one of the disks having an inner face carrying contact members which co-operate with the contact members carried by the fixed assembly.

6. A device according to claim 5, wherein the contact members carried by the second disk of the second component of the moving assembly comprise coaxial tracks in the form of circular arcs defining the short angular range of rotation, and the contact members carried by the fixed assembly comprise at least one wiper block whose wipers co-operate with respective tracks of the other contact members.

7. A device according to claim 6, wherein the contact members carried by the fixed assembly comprise two wiper blocks that are circumferentially spaced apart by an angle corresponding substantially to the short angular range of rotation so that the wipers of the two blocks come into contact with the respective tracks only when the second component of the moving assembly is in a central position which corresponds to the normal operation position.

8. A device according to claim 6, wherein the short angular range of rotation is about 20° to 30°.

9. A device according to claim 6, wherein the co-operation between the wipers of the wiper block(s) and the coaxial tracks is obtained solely in relative rotation.

10. A device according to claim 6, wherein the co-operation between the wipers of the wiper block(s) and the coaxial tracks is obtained by relative axial translation and relative rotation.

11. A device according to claim 6, wherein the electrical connection wires passing inside the two components of the moving assembly are connected to the coaxial tracks carried by the second disk of the second component of the moving assembly, the wiper block(s) carried by the fixed assembly serving to provide a link with electrical connection wires associated with a coder card assembly secured to the fixed assembly.

* * * * *